No. 894,329. PATENTED JULY 28, 1908.
C. L. KENNEDY.
ELECTRIC GENERATOR OR MOTOR.
APPLICATION FILED JULY 29, 1905.
2 SHEETS—SHEET 1.
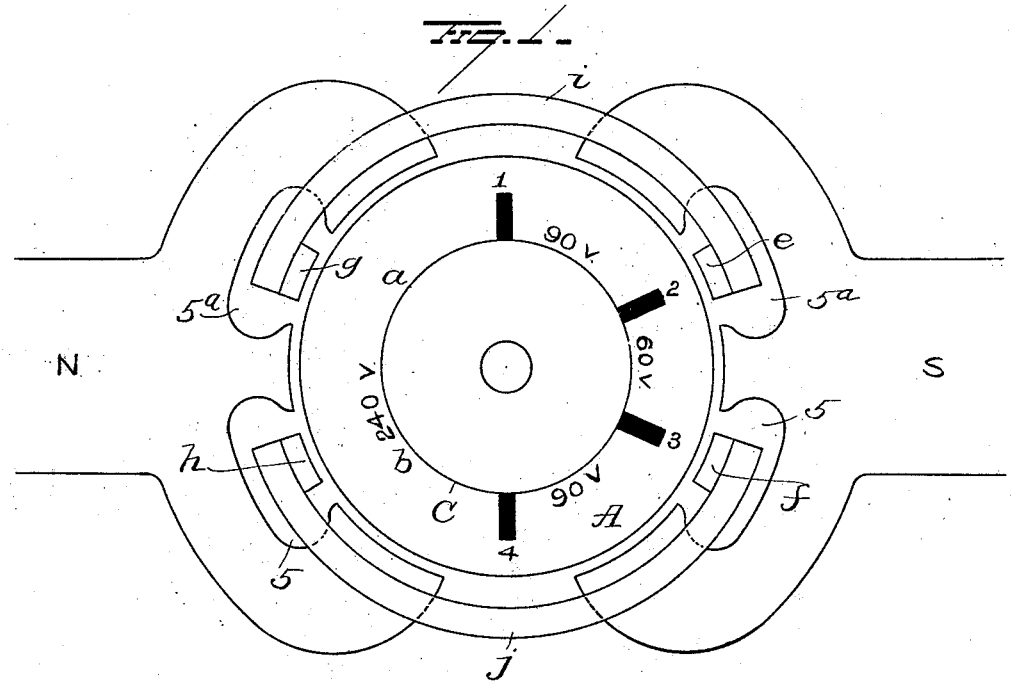
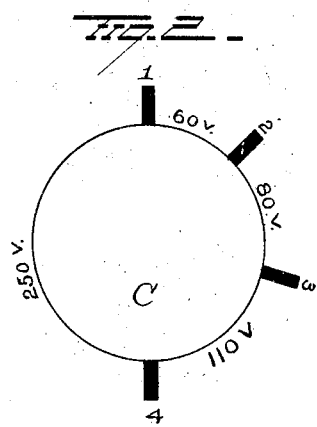
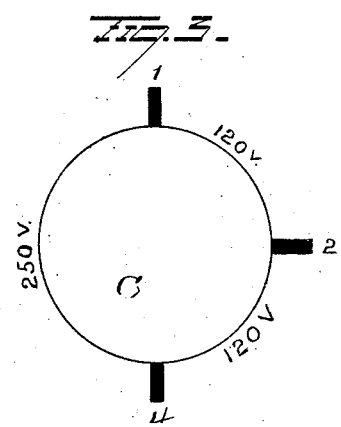

No. 894,329. PATENTED JULY 28, 1908.
C. L. KENNEDY.
ELECTRIC GENERATOR OR MOTOR.
APPLICATION FILED JULY 29, 1905.
2 SHEETS—SHEET 2.
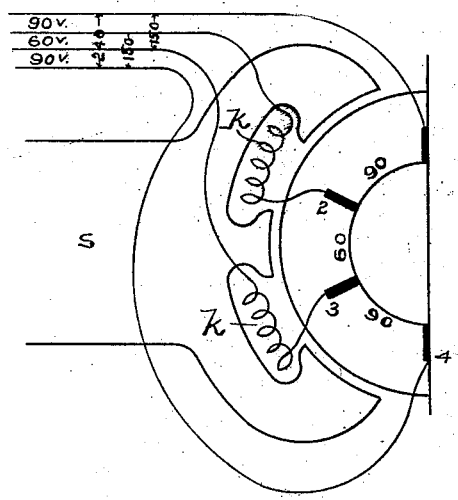
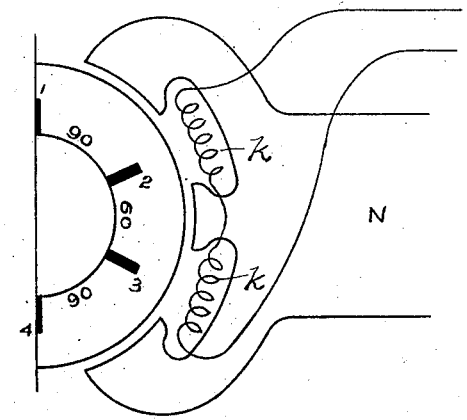
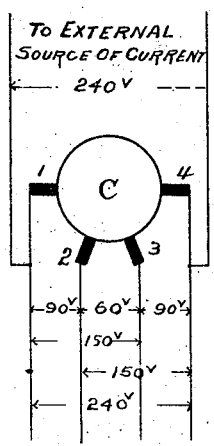
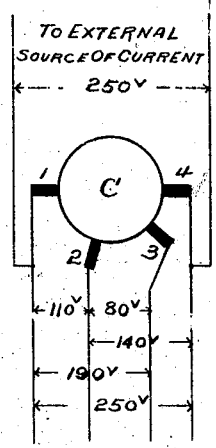
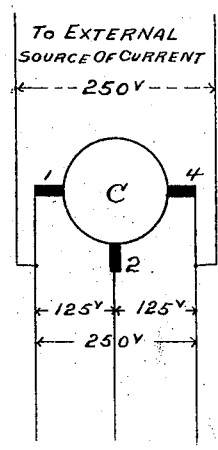
WITNESSES
INVENTOR
Attorney

UNITED STATES PATENT OFFICE.

CARLTON L. KENNEDY, OF BRAINTREE, MASSACHUSETTS.

ELECTRIC GENERATOR OR MOTOR.

No. 894,329.  Specification of Letters Patent.  Patented July 28, 1908.

Application filed July 29, 1905. Serial No. 271,807.

*To all whom it may concern:*

Be it known that I, CARLTON L. KENNEDY, a resident of Braintree, in the county of Norfolk and State of Massachusetts, have invented certain new and useful Improvements in Electric Generators or Motors; and I do hereby declare the following to be a full, clear, and exact description of the invention, such as will enable others skilled in the art to which it appertains to make and use the same.

My invention relates to improvements in continuous current electric generators and motors, an object of the invention being to construct the machine in such manner that it can be operated as a multi-speed motor, or as a multi-voltage generator or as a motor-generator driven by an outside source of current and generating currents of different voltages.

A further object is to provide such a machine with simple and efficient means for preventing sparking at the brushes.

In the accompanying drawings: Figure 1 is a diagrammatical view showing an embodiment of my invention; Figs. 2 and 3 show other arrangements of brushes: Fig. 4 is a diagram showing external circuits with brushes arranged as in Fig. 1. Figs. 5 and 6 are diagrams showing external circuits with brushes arranged as shown in Figs. 2 and 3. Figs. 7 and 8 are views showing modifications.

For the sake of convenience and simplicity in illustrating my invention, I have shown diagrammatically, in Fig. 1, a bipolar machine, although my invention is equally well adaptable to a dynamo or motor of the multipolar type. The pole pieces of the respective field magnets are shown at N. S. and between these, the armature A is located. This armature may be of the ring type having closed coils, or a drum armature may be used. The commutator is shown at C and its segments are connected with the armature coils in a manner which is well understood. Commutator brushes 1, 4, bear against the commutator at or near the neutral points and these may be connected with an external circuit in the usual way. The machine thus far described is the standard bi-polar dynamo.

At points between the commutator brushes 1—4, auxiliary brushes are made to bear against the commutator, and from these brushes, currents of various voltages can be taken, as will be hereinafter more fully explained. In Fig. 1, I have shown two such auxiliary brushes 2, 3. Assuming that the total voltage generated by the machine is 240, the voltage in the external circuit between the brushes 2 and 3 will be 60, and between the brushes 1 and 2, and 3 and 4 the voltage will be 90. It is apparent then, that with the use of the auxiliary brushes 2 and 3, arranged with respect to the commutator brushes 1—4, as shown in Fig. 1, 60—90 and 240 volt currents may be obtained. It will also be observed that 150 volt current can be obtained between the brushes 1 and 3 or 2 and 4.

Assume now that instead of operating the machine as a dynamo, it be run as a motor. Current of the proper voltage being supplied to the brushes 1—4, the machine will operate as a bi-polar motor, standard in every respect. If however, the current be supplied to the auxiliary brushes 2—3, it will be readily seen that but one-fourth of the conductors on that side of the armature will be active, and that therefore, in order to generate the proper counter electro-motive-force, the armature will run four times faster than when the current was supplied to the brushes 1—4. Similarly, current supplied to brushes 1—3, will cause the armature to run about 1.6 faster than at first, and if the current be supplied at brushes 1—2, the motor will run approximately 2.5 faster. Thus, by making proper combinations of brushes in connecting the motor in circuit with the source of electrical energy, the speed of the motor may be varied in about the proportions of 1: 1.6: 2.5: 4. By using field variation in the usual manner, speed may be obtained between these ratios.

Experience has shown that the average resistance between brushes 2 and 3, when arranged as shown in Fig. 1, is about one-third that between the commutator brushes 1—4. Therefore when the increased radiation, secured at high speed is considered, it will readily be seen that the output on the highest speed is about double that on the lowest speed. That is to say; the power developed varies about as the square root of the speed.

By using one, two, three or more auxiliary brushes on the commutator, and by placing them at other positions than shown at 2—3, Fig. 1, many other combinations may be formed. Some of these are shown in Figs. 2 and 3. Fig. 2 shows the commutator of a bi-polar armature around which brushes are grouped to give six voltages when the machine is run as a dynamo,—viz. 60—80—110—140—190—250 volts. When used as a motor, speeds would be obtained in about the following proportions; 1; 1.3; 1.8; 2.4; 3.2; 4.1.

When, as shown in Fig. 3, only one auxiliary brush is placed at 2, dividing the armature into two equal sections, the machine may be used as a three-wire generator, as a motor balanced for a three-wire circuit, or as a two-speed motor.

In the arrangement shown in Fig. 1, auxiliary brushes may be placed on the commutator at points $a$, $b$, and connected in parallel respectively with brushes 2 and 3.

The arrangements of auxiliary brushes hereinbefore described are not limited to bi-polar machines, since the same principle may be utilized in a multipolar machine by supplying as many sets of brushes as there are pairs of poles. With a multi-polar armature wound with the so-called "wave" winding but one set of brushes is necessary although more may be used if desired.

When a machine arranged as shown in Fig. 2, is used as a motor, by applying a 250 volt current to brushes 1 and 4, current may be taken from the auxiliary brushes in the same manner as though it were driven by an outside source of mechanical power. The machine then becomes a multi-voltage motor-generator, giving voltages of 60, 80, 110, 140, 190 and 250. If the current be supplied to brushes 1 and 2, the voltages obtainable will be 250; 320, 440, 560, 760, 1000. Similarly, other voltages may be obtained by supplying the primary current to other brushes. The same plan may be pursued with the arrangements shown in Figs. 1 and 3 or any other combination.

It is a fact well understood that in order to secure good commutation in a continuous current generator, all the brushes which are carrying current should be placed on a "neutral spot" on the commutator;—that is to say, a spot on the commutator where a brush may be placed without short-circuiting a coil which is cutting lines of force. Thus, in Fig. 1, brushes 1 and 4 are on neutral spots if the bars on which they rest are connected to coils occupying the positions $c$ and $d$ on the armature core. In the ordinary generator or motor however, the positions of the auxiliary brushes in Fig. 1 would not be neutral points, and if brushes were placed on these spots, sparking would occur. It is therefore important, when brushes are placed on the commutator at points other than at the neutral spots, to provide some means of eliminating sparking. This may be done in several ways, viz: by increasing the resistance of the coil or coils undergoing commutation, and so limiting the current which may be induced in them while they are short-circuited by the brush; or by providing "artificial" neutral points on the commutator at the positions where it is desired to place brushes; or by a combination of these methods.

The first plan,—that of increasing the resistance of the short circuited coil, may be accomplished by using high resistance leads to connect the commutator to the winding. Instead of connecting the sub-divisions of a closed coil winding directly to the commutator in the usual manner, they are connected through wires or strips of comparatively high resistance. Then, since the armature is short-circuited upon itself, any of these high resistance strips will be carrying current only when the commutator bar to which it is connected is carrying current, or is under a brush, and it will be carrying no current when the commutator bar to which it is connected is cut out of circuit by passing from under the brush. Therefore, these resistance leads, which carry current but a small part of the time, may be made small and of high resistance without greatly affecting the heating or the regulation of the armature.

The second method, that of producing artificial neutral points on the commutator, may be carried out by cutting slots in the pole pieces of the field magnets at the desired points in an axial direction. In Fig. 1 of the drawing I have shown each pole piece having two slots 5, $5^a$, each having a cross section approximately elliptical. The lines of force from the pole pieces will then pass into the armature at those places where the iron of the pole piece closely approaches the armature, while the large air spaces will be comparatively free from them.

If the armature is "ring wound," it will only be necessary to cut away the pole piece at $5^a$, in order to place brush 2 on the commutator. If the armature is "drum wound," both pole pieces must be slotted at points opposite one another, since each coil of a drum armature is laid upon the armature surface at two diametrically opposite points.

While the above method will produce approximately neutral spots upon the commutator, it will be found that if the air spaces formed by the slots in the pole pieces are so small as not to unduly increase the size of the field structure, a small number of lines of force will leak through these air spaces, and will enter the armature. If absolutely neutral points are desired at the slots, these stray lines of force must be prevented from entering the armature. I therefore place iron bars $e$, $f$, $g$, $h$, in the air-gaps formed by the slots, close to the armature and parallel to its axis. The bars should be considerably longer than the axial diameters of the pole pieces and each end of each bar should be connected to the one occupying a similar position under the other pole piece, by iron connecting bars $i$, $j$, which are well clear of both pole pieces and the armature. Thus any stray lines of force emanating from pole piece $f$ and crossing an air-gap, will not reach the armature, but will pass into a bar (as $e$) which protects the armature along its full length. They will then pass through a connecting bar (as $i$) to the corresponding bar (as $g$) in a groove or air-gap in the pole piece N, and enter said pole piece. Thus, brushes 2 and 3 will be set upon the commutator at almost absolutely neutral points and no difficulty will be encountered with commutation.

The stray lines of force at the slotted portions of the pole pieces, opposite which it may be desired to place brushes, may also be overcome by displacing the iron bars $e, f, g, h$, with coils $k$ of fine wire inserted in the slots or air-gaps, said coils being connected, either directly across the line, or in series with the shunt field coils (Fig. 8). If these coils be wound so as to oppose the field, and be correctly proportioned, they will effectually oppose the passage of any stray lines of force. These coils might be wound with heavy wire and each one connected in series with the brush under it (Fig. 7). The magnetic effect will be proportional to the current flowing through the brush and may be made of the right polarity to provide a positive field for commutation, the strength of which will vary with the current passing through the brush.

Having fully described my invention, what I claim as new and desire to secure by Letters-Patent is:—

1. A continuous current dynamo or motor having a slot in the face of each pole piece, means for shunting magnetic lines of force around the armature from the slotted portions of the pole pieces and one or more auxiliary brushes upon the commutator on the neutral spots formed by said slots, the slots and brushes being so spaced that the voltages generated under the two adjacent sections of one pole face formed by the slot therein, are unequal.

2. A continuous current dynamo or motor having a slotted pole piece, one or more auxiliary brushes upon the commutator on the neutral points formed by the slots of the pole piece, an iron bar in each slot of the pole piece and a conductor for lines of force shunting the armature and connected with each of said iron bars.

3. A continuous current dynamo or motor having a slotted pole piece, auxiliary brushes upon the commutator on the neutral points formed by the slots in the pole piece, an iron bar in each of said slots, and an iron bar connecting each of the iron bars in the slots with another part of the magnetic circuit.

4. A continuous current dynamo or motor having a slot in the face of each pole piece and one or more auxiliary brushes upon the commutator on the neutral spots formed by said slots, the brushes being so placed upon one half of the commutator only as to avoid local cross currents in the armature, substantially as illustrated and described.

5. A continuous current dynamo or motor having two or more slots in the face of each pole piece and two or more auxiliary brushes upon the commutator on the neutral spots formed by said slots, the brushes being so placed on one half of the commutator only as to avoid cross currents in the armature, substantially as illustrated and described.

6. A continuous current dynamo or motor having a slot in the face of each pole piece and one or more auxiliary brushes upon the commutator on the neutral spots formed by said slots, the brushes being so placed on one half of the commutator only and so connected as to avoid local cross currents in the armature and the slots and brushes so spaced that the voltages generated under the two adjacent sections formed in one pole face by said slots are unequal.

7. A continuous current dynamo or motor having two or more slots in the face of each pole piece and two or more auxiliary brushes upon the commutator on the neutral spots formed by said slots, the brushes being so placed on one side of the commutator only and so connected as to avoid local cross currents in the armature, and the slots and brushes being so spaced that the voltages generated under at least two of the adjacent sections in one pole face formed by said slots, are unequal.

8. A continuous current dynamo or motor having a slot in the face of each pole piece and one or more auxiliary brushes upon one side only of the commutator on the neutral spots formed by said slots, the brushes being so placed and connected as to avoid local cross currents in the armature, and the slots and brushes being so spaced that different voltages generated may be combined to form approximately an increasing or decreasing progression.

9. A continuous current dynamo or motor having two or more slots in the face of each pole piece and two or more auxiliary brushes upon the commutator on the neutral spots formed by said slots, the brushes being so placed on one side only of the commutator and so connected as to avoid local cross currents in the armature, and slots and brushes being so spaced that the different voltages generated may be combined to form approximately a regularly increasing or decreasing progression.

10. A continuous current dynamo or motor having one or more slots in the face of each pole piece, one or more auxiliary brushes upon the commutator on the neutral spots formed by said slots, an iron bar in each slot and iron bars connecting the bars in the slots of one pole piece with the bars in the slots of another pole piece.

11. A continuous current dynamo or motor having one or more slots in the face of each pole piece, one or more auxiliary brushes upon the commutator on the neutral spots formed by said slots, an iron bar in each slot, iron bars connecting the bars in the slots in one pole piece with the bars in the slots of another pole piece, the brushes being so placed and connected as to avoid local cross currents in the armature, and the slots and brushes being so spaced that the different voltages generated may be combined to form approximately a regular increasing or decreasing progression.

12. A continuous current dynamo or motor having one or more slots in the face of each pole piece, one or more auxiliary brushes upon the commutator on the neutral spots formed by said slots, a conductor in each slot, said conductors being so connected as to oppose leakage of the magnetic flux due to main field coils, through said slots and into the armature.

13. A continuous current dynamo or motor having one or more slots in the face of each pole piece, one or more auxiliary brushes upon the commutator on the neutral spots formed by said slots, a conductor in each slot, said conductors being so connected as to oppose the leakage of the magnetic flux due to the main field, through said slots and into the armature, the aforesaid brushes being so placed and connected as to avoid local cross currents in the armature, and the slots and brushes being so spaced that the different voltages generated may be combined to form approximately a regularly increasing or decreasing progression.

14. A continuous current generator or motor having a slot in each pole piece, an auxiliary brush on the commutator on the neutral point formed by said slots, an iron bar in the slot of each pole piece, and an iron bar connecting the bar in the slot of one pole piece with the bar in the slot of the other pole piece.

15. A generator or motor having two or more slots in the face of each pole piece, auxiliary brushes on the commutator on the neutral points formed by said slots, an iron bar in each slot, and iron bars connecting the bars in the slots in one pole piece with the bars in the slots of the other pole piece to divert lines of force around the armature.

In testimony whereof, I have signed this specification in the presence of two subscribing witnesses.

CARLTON L. KENNEDY.

Witnesses:
PERLEY E. BARBOUR,
JOHN BARBOUR.